(12) United States Patent
Withrow et al.

(10) Patent No.: US 7,426,924 B2
(45) Date of Patent: Sep. 23, 2008

(54) ENGINE AND VENTILATION SYSTEM

(75) Inventors: Michael Paul Withrow, Peoria, IL (US);
Seth Evan Slaughter, Peoria, IL (US);
Christopher Michael Dolan, East Peoria, IL (US); Bryant Lee Richie, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 44 days.

(21) Appl. No.: 11/116,329

(22) Filed: Apr. 28, 2005

(65) Prior Publication Data
US 2006/0243258 A1 Nov. 2, 2006

(51) Int. Cl.
*F02M 25/06* (2006.01)
(52) U.S. Cl. ...................................... 123/572
(58) Field of Classification Search ......... 123/572–574, 123/41.86
See application file for complete search history.

(56) References Cited

U.S. PATENT DOCUMENTS

| | | | |
|---|---|---|---|
| 5,497,755 A * | 3/1996 | Maloney | 123/572 |
| 5,722,376 A | 3/1998 | Sweeten | |
| 5,786,641 A | 7/1998 | Nakanishi et al. | |
| 5,792,949 A | 8/1998 | Hewelt et al. | |
| 5,897,597 A | 4/1999 | O'Daniel | |
| 6,575,022 B1 | 6/2003 | Schneider et al. | |
| 6,606,982 B1 * | 8/2003 | Stockhausen et al. | 123/572 |
| 6,691,687 B1 * | 2/2004 | Liang et al. | 123/572 |
| 6,709,477 B1 * | 3/2004 | Håkansson et al. | 55/401 |
| 2001/0047801 A1 * | 12/2001 | Baeuerle et al. | 123/574 |
| 2002/0104517 A1 * | 8/2002 | Shea et al. | 123/572 |
| 2005/0022795 A1 * | 2/2005 | Beyer et al. | 123/516 |

* cited by examiner

*Primary Examiner*—M. McMahon
(74) *Attorney, Agent, or Firm*—Finnegan, Henderson, Farabow, Garrett & Dunner

(57) ABSTRACT

An engine has a housing and a working member movable within an interior of the housing and separating a combustion chamber from a non-combustion chamber. Additionally, the engine may include a chamber-ventilation system that may include a passageway with a first end of the passageway connected to the non-combustion chamber and a second end of the passageway located downstream of the first end of the passageway. The chamber-ventilation system may further include a filter system disposed within the passageway. The filter system may include a filter housing and a filter disposed in the filter housing. Additionally, the chamber-ventilation system may be configured such that, during operation of the engine, gas travels from the non-combustion chamber, into the first end of the passageway, through the passageway, to the second end of the passageway. The engine may further include a first sensor configured to sense an operating condition of the chamber-ventilation system or another operating condition of the engine that relates to an operating condition of the chamber-ventilation system and to produce a signal relating to the operating condition sensed.

20 Claims, 8 Drawing Sheets

ENGINE AND VENTILATION SYSTEM

TECHNICAL FIELD

The present disclosure relates to engines for work machines and to ventilation systems for such engines.

BACKGROUND

Work machines, such as medium duty and heavy duty on-highway trucks, hydraulic excavators, wheel loaders, off-highway trucks and other heavy construction and mining machines, are used to perform many tasks. To effectively perform these tasks, a work machine requires a power source, such as an internal combustion engine. Internal combustion engines often include a housing, such as an engine block, and one or more working members, such as pistons. Typically, each working member is movably supported within the housing of the engine and separates a combustion chamber from a non-combustion chamber of the housing, such as a crankcase. Such engines combust fuel and air in the combustion chamber to produce power by driving the working member.

High pressure in the combustion chamber may drive combustion gases through spaces between the housing and the working member, into the non-combustion chamber. Undesirably high pressure in the non-combustion chamber may result. Additionally, combustion gases in the non-combustion chamber may contaminate and degrade oil in the non-combustion chamber. Furthermore, venting combustion gases from the non-combustion chamber directly to the atmosphere can have negative environmental consequences.

At least one internal combustion engine has been disclosed with provisions for venting combustion gases from the non-combustion chamber back into the combustion chamber. For example, U.S. Pat. No. 5,897,597 ("the '597 patent") shows an internal combustion engine with a positive crankcase ventilation system. The positive crankcase ventilation system includes an outlet passage connected between a crankcase of the engine and an intake bore of the engine. Vacuum in an intake manifold of the internal combustion engine draws combustion gases out of the crankcase, into the intake bore, and then into the intake manifold for distribution to the engine cylinders.

Although the engine of the '597 patent draws combustion gases from the crankcase without admitting them directly into the atmosphere, the design includes disadvantages. The positive crankcase ventilation system of the '597 patent includes no provisions to prevent drawing oil and debris from the crankcase into the intake bore, the intake manifold, and the engine cylinders. Oil drawn from the crankcase into the intake bore, the intake manifold, and the engine cylinders can fowl the engine, causing poor performance. Debris drawn from the crankcase into the intake bore, the intake manifold, and the engine cylinders can accelerate engine wear and may even cause catastrophic engine failure.

The engine of the present disclosure solves one or more of the problems set forth above.

SUMMARY OF THE INVENTION

One disclosed embodiment includes an engine that may include a housing. The engine may further include a working member movable within an interior of the housing and separating a combustion chamber from a non-combustion chamber. Additionally, the engine may include a chamber-ventilation system that may include a passageway with a first end of the passageway connected to the non-combustion chamber and a second end of the passageway located downstream of the first end of the passageway. The chamber-ventilation system may further include a filter system disposed within the passageway. The filter system may include a filter housing and a filter disposed in the filter housing. Additionally, the chamber-ventilation system may be configured such that, during operation of the engine, gas travels from the non-combustion chamber, into the first end of the passageway, through the passageway, to the second end of the passageway. The engine may further include a first sensor configured to sense an operating condition of the chamber-ventilation system or another operating condition of the engine that relates to an operating condition of the chamber-ventilation system and to produce a signal relating to the operating condition sensed.

Another embodiment relates to a method of operating an engine. The engine may include a housing. The engine may further include a working member movable within an interior of the housing and separating a combustion chamber from a non-combustion chamber. The engine may also include an air-intake system configured to supply air to the combustion chamber. Additionally, the engine may include a chamber-ventilation system that may include a passageway with a first end of the passageway connected to the non-combustion chamber and a second end of the passageway located downstream of the first end of the passageway. The method may include directing gas out of the non-combustion chamber through the passageway and filtering the gas as it passes through the passageway. The method may further include sensing at least one of an operating condition of the chamber-ventilation system and another operating condition of the engine that relates to an operating condition of the chamber-ventilation system and producing a signal relating to the operating condition sensed.

A further embodiment relates to a work machine that may include a chassis and an engine mounted to the chassis. The engine may include a housing. The engine may further include a working member movable within an interior of the housing and separating a combustion chamber from a non-combustion chamber. The engine may also include an air-intake system, that may include a supercharger, configured to supply air to the combustion chamber. Additionally, the engine may include a chamber-ventilation system that may include a passageway with a first end of the passageway connected to the non-combustion chamber and a second end of the passageway connected to the air-intake system on an inlet side of the supercharger. The chamber-ventilation system may further include a filter system disposed within the passageway. The filter system may include a filter housing and a filter disposed in the filter housing. Additionally, the chamber-ventilation system may be configured such that, during operation of the engine, gas travels from the non-combustion chamber, into the first end of the passageway, through the passageway, to the second end of the passageway. The engine may further include a first sensor configured to sense an operating condition of the chamber-ventilation system or another operating condition of the engine that relates to an operating condition of the chamber-ventilation system and to produce a signal relating to the operating condition sensed.

DETAILED DESCRIPTION

Figure 1:
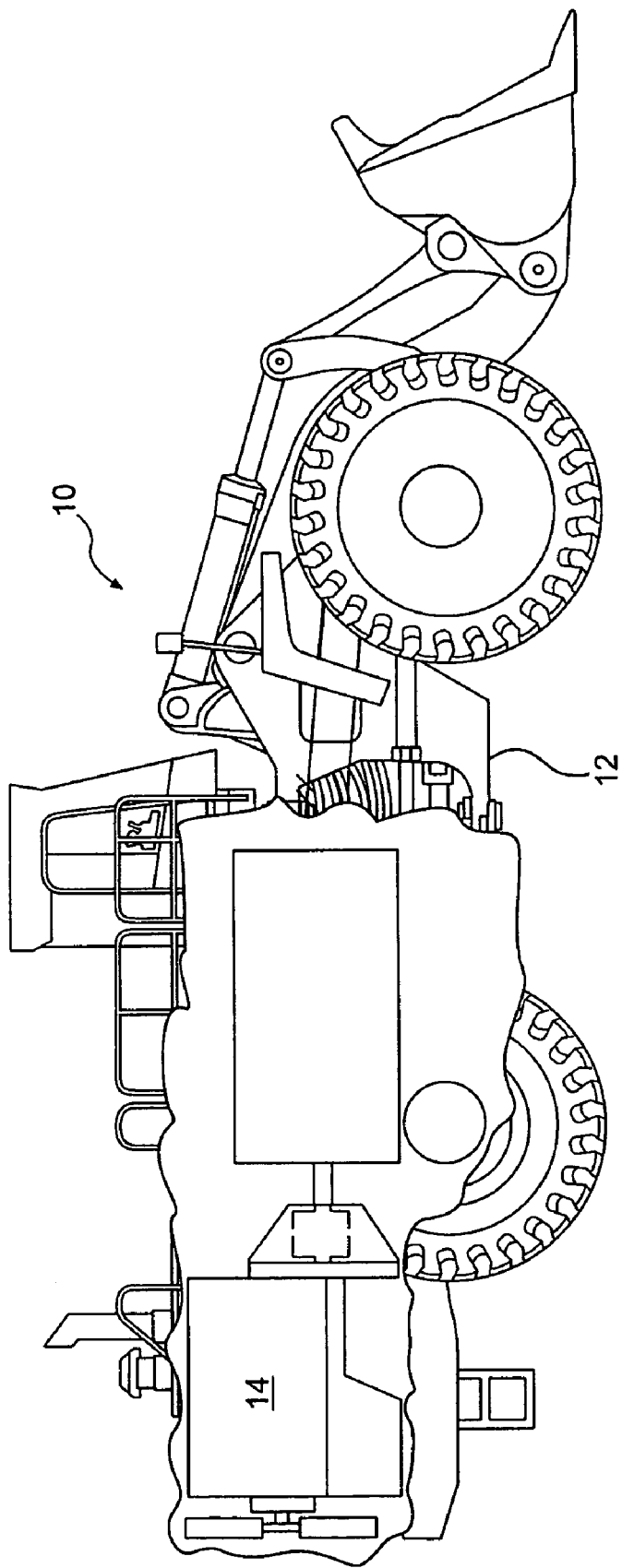
FIG. 1 is a diagrammatic illustration of a work machine with which an engine and sensor consistent with one disclosed embodiment may be utilized.

FIG. 1 provides a diagrammatic perspective view of a work machine 10 according to an exemplary disclosed embodiment. Work machine 10 includes a chassis 12 and an engine 14.

Figure 2:
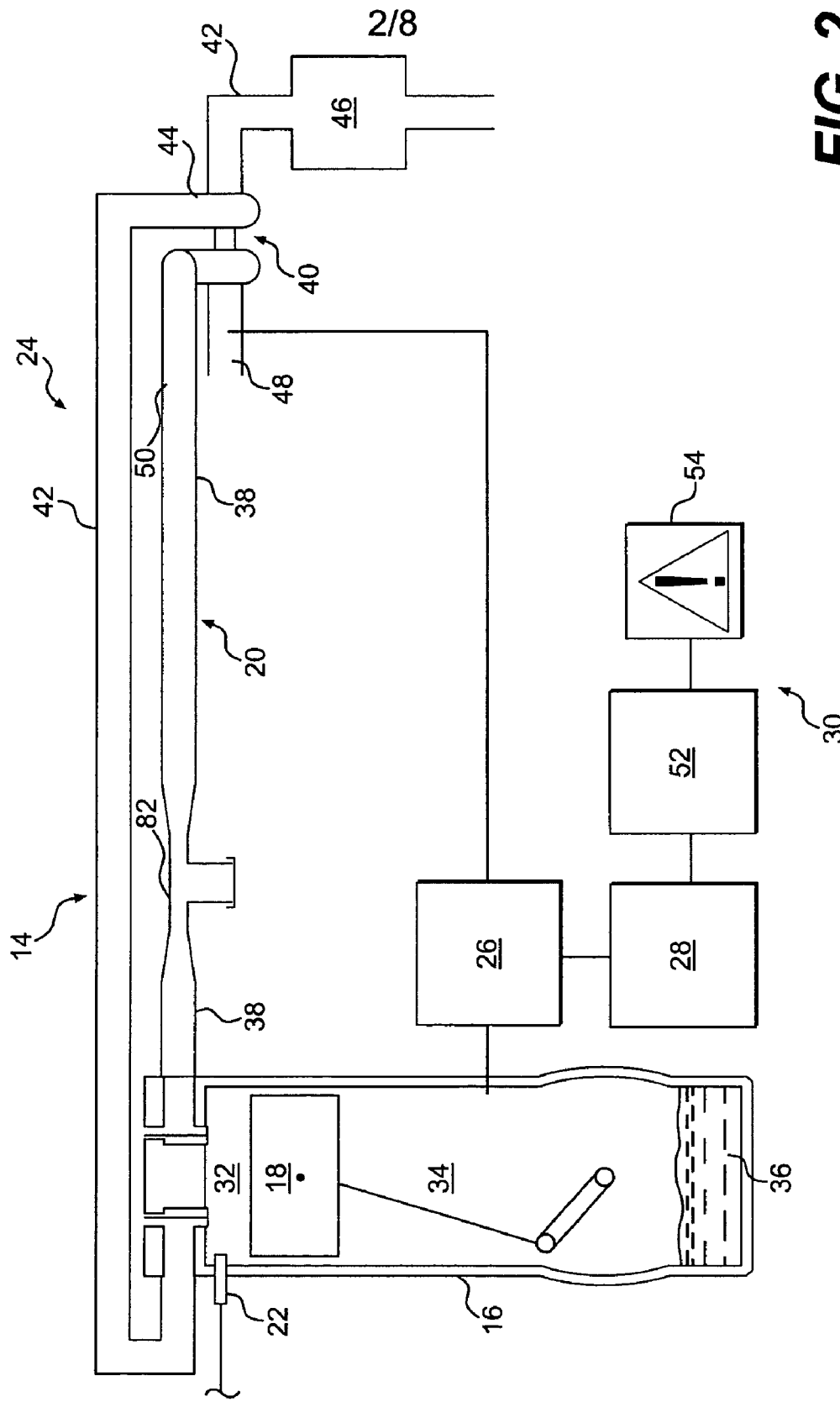
FIG. 2 is a schematic illustration of an engine consistent with one disclosed embodiment.

FIG. 2 provides a schematic illustration of engine 14 consistent with certain disclosed embodiments. Engine 14 may include a housing 16, a working member 18, an air-intake system 20, a fuel system 22, an exhaust system 24, a chamber-ventilation system 26, a sensor 28, and a monitoring system 30.

Working member 18 may be movably disposed in an interior of housing 16 such that it separates a combustion chamber 32 from a non-combustion chamber 34, such as a crankcase. As shown in FIG. 2, working member 18 may be a piston supported in a cylindrical portion of housing 16. Oil 36 may reside within non-combustion chamber 34.

Housing 16, working member 18, combustion chamber 32, and non-combustion chamber 34 are not limited to the configuration shown in FIG. 2. Working member 18 may have any shape and may be movably supported within housing 16 in any manner such that it separates combustion chamber 32 from non-combustion chamber 34. For example, working member 18 may be a rotor that rotates within housing 16, as in a Wankel type internal combustion engine.

Air-intake system 20 may be connected to housing 16 and configured to supply air to combustion chamber 32. Air-intake system 20 may include ducts 38 that route air to combustion chamber 32. Additionally, air-intake system 20 may include plenums, manifolds, valves, and/or filters. Air intake-system 20 may further include a supercharger 40 configured to pump pressurized air to combustion chamber 32. Supercharger 40 may be a turbocharger with a drive turbine in fluid communication with exhaust system 24, as is shown in FIG. 2. Alternatively, supercharger 40 may be mechanically connected, such as through a crankshaft, to working member 18, so as to derive power from working member 18. Moreover, supercharger 40 may be connected to an electric or hydraulic motor, so as to derive power therefrom.

Fuel system 22 may be configured to deliver fuel to combustion chamber 32. Fuel system 22 may be configured to deliver fuel directly into combustion chamber 32, as shown in FIG. 2. Alternatively, fuel system 22 may be configured to deliver fuel into air-intake system 20, to be carried to combustion chamber 32 by air in air-intake system 20.

Exhaust system 24 may be connected to housing 16 and configured to expel combustion gases from combustion chamber 32 to the atmosphere. Exhaust system 24 may include ducts 42 that route combustion gases from combustion chamber 32 to various other components of exhaust system 24 and, ultimately, to the atmosphere. Other components of exhaust system 24 may include, but are not limited to, one or more turbine housings 44 of turbochargers, one or more gas-treatment units 46, and one or more mufflers (not shown).

Chamber-ventilation system 26 may be configured to vent gas from non-combustion chamber 34. One end of chamber-ventilation system 26 may be connected to non-combustion chamber 34. Another end of chamber-ventilation system 26 may be connected to another component of engine 14 and/or other components of work machine 10. For example, chamber-ventilation system 26 may be connected between non-combustion chamber 34 and air-intake system 20, as shown in FIG. 2. Chamber-ventilation system 26 may connect to a portion of air-intake system 20 on an inlet side 48 of supercharger 40, as is shown in FIG. 2. Alternatively, chamber-ventilation system 26 may connect to a portion of air-intake system 20 on an outlet side 50 of supercharger 40. In addition to, or instead of, connecting to air-intake system 20, chamber-ventilation system 26 may connect to exhaust system 24. For example, chamber-ventilation system 26 may connect to a portion of exhaust system 24 between combustion chamber 32 and gas-treatment unit 46.

Sensor 28 may be configured to sense an operating condition of chamber-ventilation system 26 and/or another operating condition of engine 14 relating to an operating condition of chamber-ventilation system 26 and to produce a signal relating to the operating condition sensed. For example, sensor 28 may be configured to sense a condition of one or more of the components of chamber-ventilation system 26 and to produce a signal relating to the sensed operating condition of one or more components of chamber-ventilation system 26. Additionally, sensor 28 may be configured to sense a condition of gas within chamber-ventilation system 26 and/or a condition of gas within non-combustion chamber 34 and to produce a signal relating to the sensed condition of the gas within chamber-ventilation system 26 and/or the sensed condition of the gas within non-combustion chamber 34.

Monitoring system 30 may be operatively connected to sensor 28 and configured to monitor signals produced by sensor 28. Monitoring system 30 may also be operatively connected to other sensors (not shown) and/or control systems (not shown) of work machine 10. Monitoring system 30 may include a computer 52. Computer 52 may include one or more processors and memory devices (not shown). Computer 52 may be a dedicated device for monitoring signals produced by sensor 28. Alternatively, computer 52 may be a controller for engine 14 (e.g., an ECU) and/or any other system of work machine 10. In addition to, or in place of, computer 52, monitoring system 30 may include hardwired logic circuitry. Additionally, monitoring system 30 may include an alarm 54 operatively connected to computer 52 or to hardwired logic circuitry of monitoring system 30. Alarm 54 may include an audio device, such as a buzzer or chime, and/or a visual device, such as a light.

Figure 3:
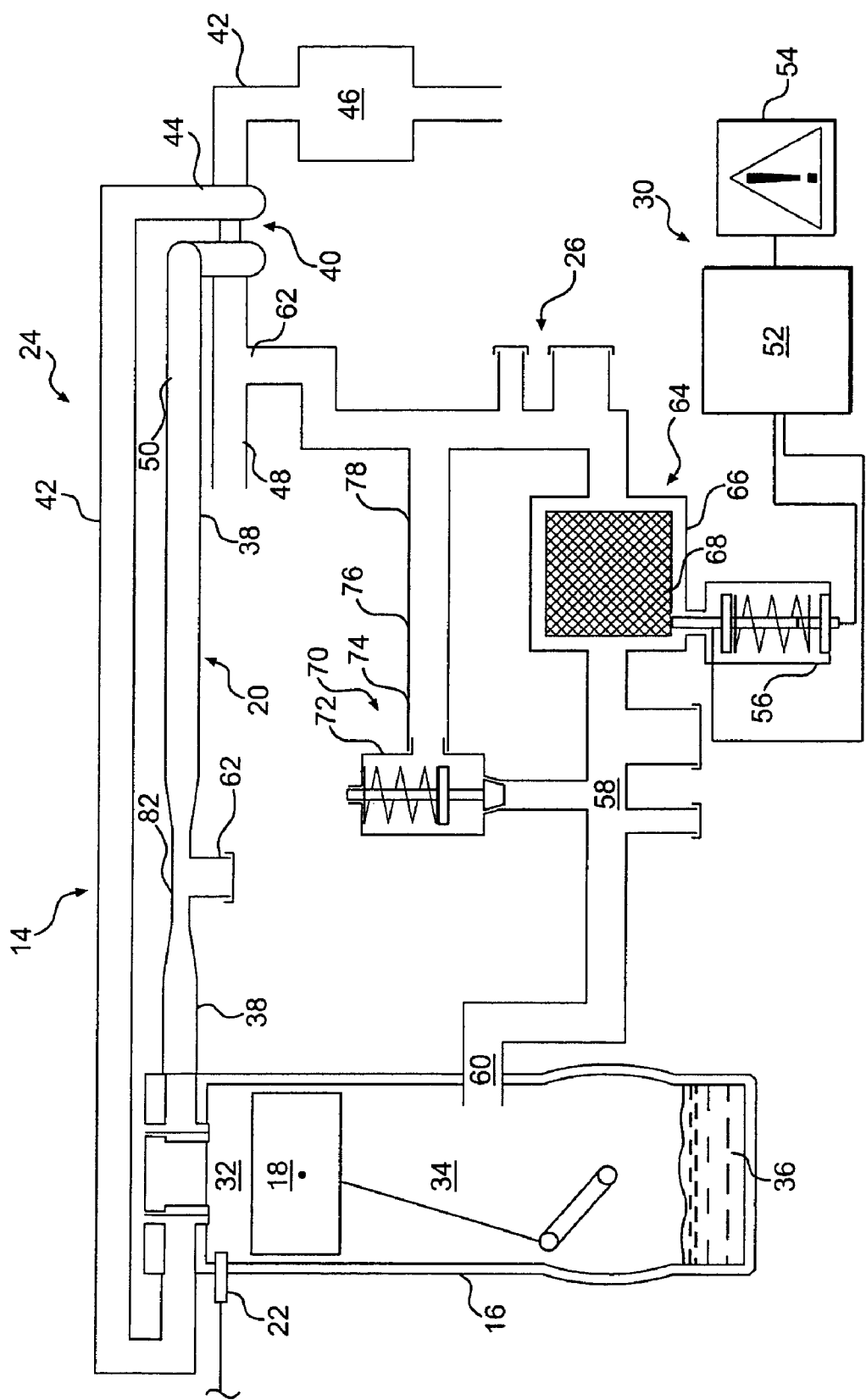
FIG. 3 is a schematic illustration of an engine consistent with another disclosed embodiment.

FIG. 3 illustrates engine 14 and one embodiment of chamber-ventilation system 26 and a sensor 56 thereof in greater detail. Chamber-ventilation system 26 may include a passageway 58 with a first end 60 of passageway 58 connected to non-combustion chamber 34. A second end 62 of passageway 58 may be connected to a portion of air-intake system 20 on a side of supercharger 40 opposite combustion chamber 32. Chamber-ventilation system 26 may include a filter system 64 with a filter housing 66 and a filter 68 therein. Filter housing 66 may define part of passageway 58.

Chamber-ventilation system 26 may also include a filter-bypass system 70 configured to allow gas upstream of filter system 64 to bypass filter system 64 under certain circumstances. Gas upstream of filter system 64 includes gas in non-combustion chamber 34 and gas in any portions of chamber-ventilation system 26 between non-combustion chamber 34 and filter system 64. Filter-bypass system 70 may include a pressure-relief valve 72 with its inlet in fluid communication with a portion of passageway 58 between non-combustion chamber 34 and filter housing 66. An outlet of pressure-relief valve 72 may be in fluid communication with a first end 74 of a filter-bypass duct 76. A second end 78 of filter-bypass duct 76 may be in fluid communication with a portion of passageway 58 between filter housing 66 and second end 62 of passageway 58.

Filter-bypass system 70 and its engagement to engine 14 and chamber-ventilation system 26 are not limited to the configuration shown in FIG. 3. For example, the inlet of pressure-relief valve 72 may be in fluid communication with non-combustion chamber 34 instead of passageway 58. Additionally, second end 78 of filter-bypass duct 76 may connect to some component of engine 14 other than chamber-ventilation system 26. Moreover, filter-bypass system 70 may omit filter-bypass duct 76, and the outlet of pressure-relief valve 72 may connect directly to another component of engine 14 or may be exposed to the atmosphere. Furthermore, in addition to, or in place of, pressure-relief valve 72, filter-bypass system 70 may include one or more controllable valves or shutters and controls for opening and closing those valves and shutters. Such controls may be configured to open or close any controllable valves or shutters of filter-bypass system 70 dependent upon the pressure of gas upstream of filter system 64 and/or dependent upon other conditions of operation of engine 14.

Chamber-ventilation system 26 is not limited to the configuration shown in FIG. 3. For example, while FIG. 3 shows components separate from housing 16 defining passageway 58, housing 16 may define part or all of passageway 58. Filter housing 66 may be an integral part of housing 16. Alternatively, filter housing 66 may be constructed separate from components that define other portions of passageway 58. Consistent with certain embodiments, filter housing 66 may connect to other components of chamber-ventilation system 26 in such a manner that filter housing 66 may be easily separated therefrom with filter 68 in filter housing 66, such that filter housing 66 and filter 68 may be removed and replaced as a unit. Additionally, while FIG. 3 shows filter housing 66 spaced from first end 60 and second end 62 of passageway 58, filter housing 66 may define first end 60 or second end 62 of passageway 58. Furthermore, second end 62 of passageway 58 may connect to other portions of air-intake system 20 or to other components of engine 14 or work machine 10, such as exhaust system 24. Moreover, chamber-ventilation system 26 may omit pressure-relief valve 72. Additionally, chamber-ventilation system 26 may include one or more pumps in fluid communication with passageway 58 and operable to pump gas away from first end 60 of passageway 58.

Sensor 56 may be configured to sense a condition of filter system 64. For example, sensor 56 may be configured to sense whether filter 68 is properly installed in chamber-ventilation system 26 and to produce a signal relating to whether filter 68 is properly installed in chamber-ventilation system 26. As is shown in FIG. 3, sensor 56 may be a switch positioned such that the switch has one state (open or closed) when filter 68 is properly installed in chamber-ventilation system 26 and the switch has the other state when filter 68 is improperly installed or absent.

Sensor 56 and its engagement with filter system 64 are not limited to the configuration shown in FIG. 3. Sensor 56 may be any type of sensor configured and associated with filter system 64 in such a manner to sense whether filter 68 is properly installed in chamber-ventilation system 26. For example, sensor 56 may be a spaced pair of electrical contacts that may be connected to one another by an electrical conductor attached to filter 68 when filter 68 is properly installed in chamber-ventilation system 26. Alternatively, sensor 56 may be an optical sensor operable to sense whether filter 68 is properly installed. Moreover, sensor 56 may be configured and engaged to filter system 64 so as to be operable to sense other conditions of filter system 64. Other conditions of filter system 64 that sensor 56 may be operable to sense include, but are not limited to, a position of one or more other components of filter system 64, a condition of gas within filter system 64, a presence and/or quantity of filtered matter in filter system 64, and a quantity and/or condition of one or more treatment substances included with filter system 64.

Figure 4:
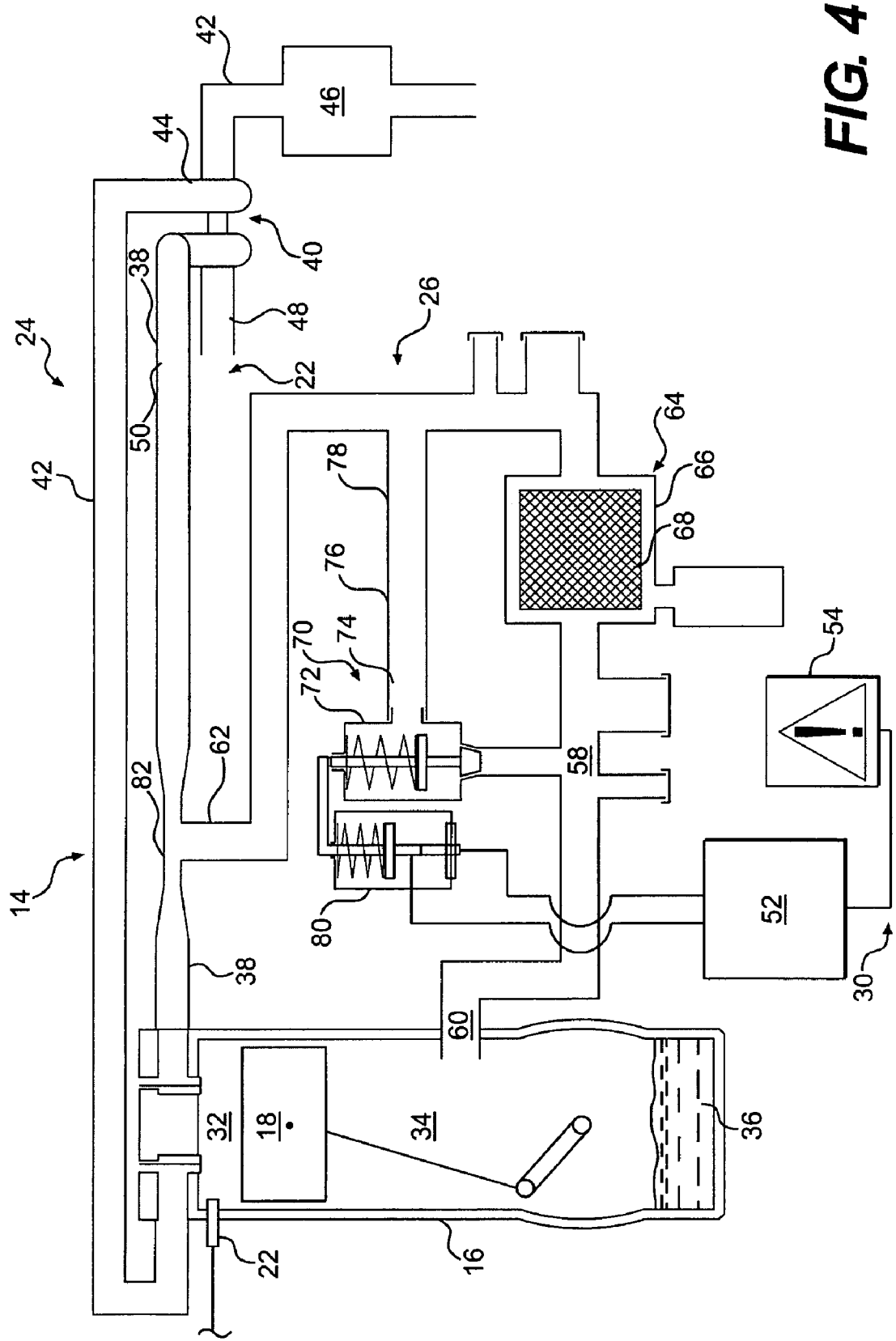
FIG. 4 is a schematic illustration of an engine consistent with yet another disclosed embodiment.

In addition to, or in place of, sensor 56 for sensing a condition of filter system 64, engine 14 may include one or more sensors for sensing a condition of other components of chamber-ventilation system 26. For example, FIG. 4 illustrates engine 14 with a sensor 80 that is operable to sense whether pressure-relief valve 72 is open. Thus, in the configuration shown in FIG. 4, sensor 80 is also configured to sense whether filter-bypass system 70 is allowing gases upstream of filter system 64 to bypass filter system 64. As is shown in FIG. 4, sensor 80 may be a switch disposed in such a position that it has one state (open or closed) when pressure-relief valve 72 is open, and the switch has the other state when pressure-relief valve 72 is closed.

Sensor 80 and its association with chamber-ventilation system 26 is not limited to the configuration shown in FIG. 4. Sensor 80 may be any type of sensor configured and engaged to chamber-ventilation system 26 in such a manner to sense whether pressure-relief valve 72 is open. Additionally, sensor 80 may be configured and engaged to chamber-ventilation system 26 so as to be operable to sense a condition of other components of chamber-ventilation system 26. Moreover, sensor 80 may be another type of sensor configured to sense whether filter-bypass system 70 is allowing gas upstream of filter system 64 to bypass filter system 64. For example, sensor 80 may be a flow sensor disposed within filter-bypass duct 76.

FIG. 4 also illustrates an alternative connection of second end 62 of passageway 58 to air-intake system 20. In the configuration shown in FIG. 4, second end 62 of passageway 58 connects to a venturi 82 that is connected between combustion chamber 32 and supercharger 40.

Figure 5:
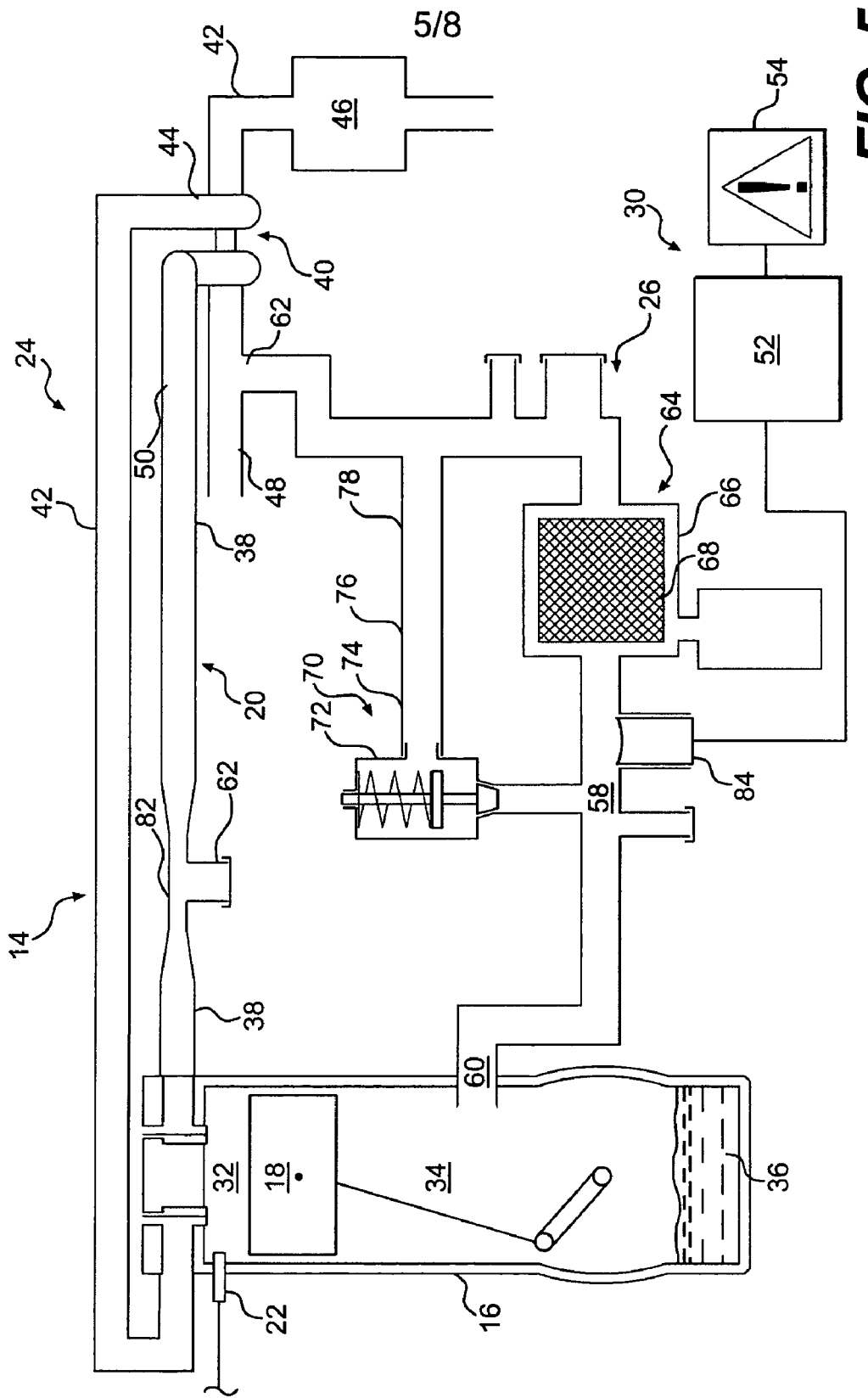
FIG. 5 is a schematic illustration of an engine consistent with yet another disclosed embodiment.

In addition to, or in place of, sensors 56 and 80 for sensing conditions of filter system 64 and/or conditions of components of chamber-ventilation system 26, engine 14 may include one or more sensors operable to sense conditions of gas in chamber-ventilation system 26 and/or non-combustion chamber 34. For example, FIG. 5 shows engine 14 with a sensor 84 configured to sense a condition of a gas upstream of filter system 64. As is shown in FIG. 5, sensor 84 may be configured to sense a pressure of the gas upstream of filter system 64. Monitoring system 30 may be operatively connected to sensor 84.

Sensor 84 and its engagement to engine 14 and chamber-ventilation system 26 are not limited to the configuration shown in FIG. 5. For example, instead of being configured to sense a pressure of the gas upstream of filter system 64, sensor 84 may be configured to sense a velocity or composition of the gas upstream of filter system 64. Additionally, sensor 84 may be mounted at a different point and/or exposed to the gas at a different point. For example, sensor 84 may be mounted remotely and connected to chamber-ventilation system 26 by one or more tubes or other types of components operable to create fluid communication between sensor 84 and passageway 58. Additionally, sensor 84 may be disposed in non-combustion chamber 34 or connected thereto by one or more tubes or other components operable to create fluid communication between sensor 84 and non-combustion chamber 34.

Figure 6:
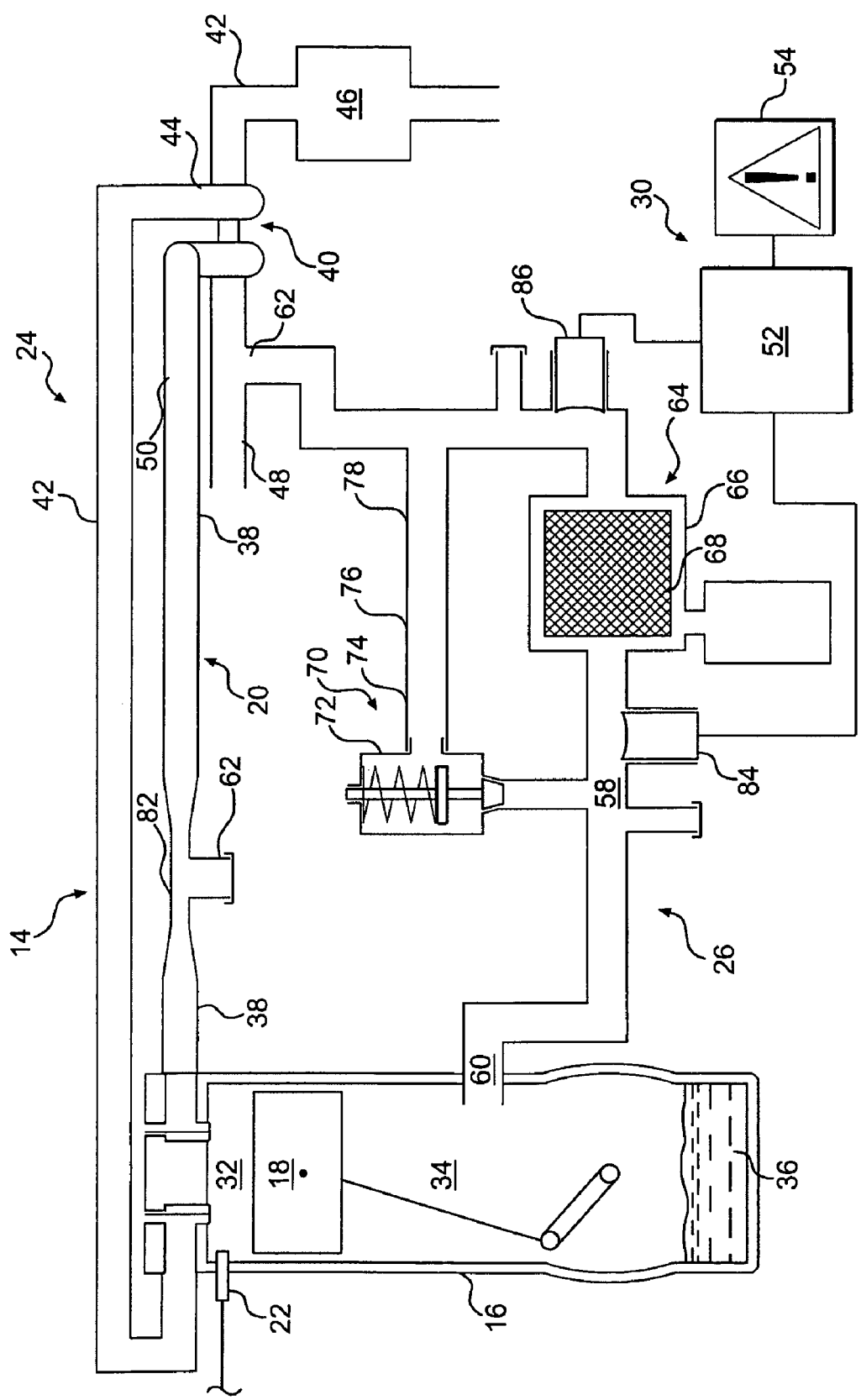
FIG. 6 is a schematic illustration of an engine consistent with yet another disclosed embodiment.

FIG. 6 shows engine 14 with an additional sensor 86 operable to sense a condition of gas downstream of filter system 64. Gas downstream of filter system 64 includes gas in portions of passageway 58 on a side of filter housing 66 opposite first end 60 of passageway 58. As is shown in FIG. 6, sensor 86 may be configured to sense a pressure of the gas downstream of filter system 64. Monitoring system 30 may be operatively connected to sensor 86.

Sensor 86 and its engagement to engine 14 and chamber-ventilation system 26 are not limited to the configuration shown in FIG. 6. For example, instead of being configured to sense a pressure of the gas downstream of filter system 64, sensor 86 may be configured to sense a velocity or composition of the gas downstream of filter system 64. Additionally, sensor 86 may be mounted at a different point and/or exposed to the gas at a different point. For example, sensor 86 may be mounted remotely and connected to chamber-ventilation system 26 by a tube or other types of components operable to create fluid communication between sensor 86 and passageway 58.

Figure 7:
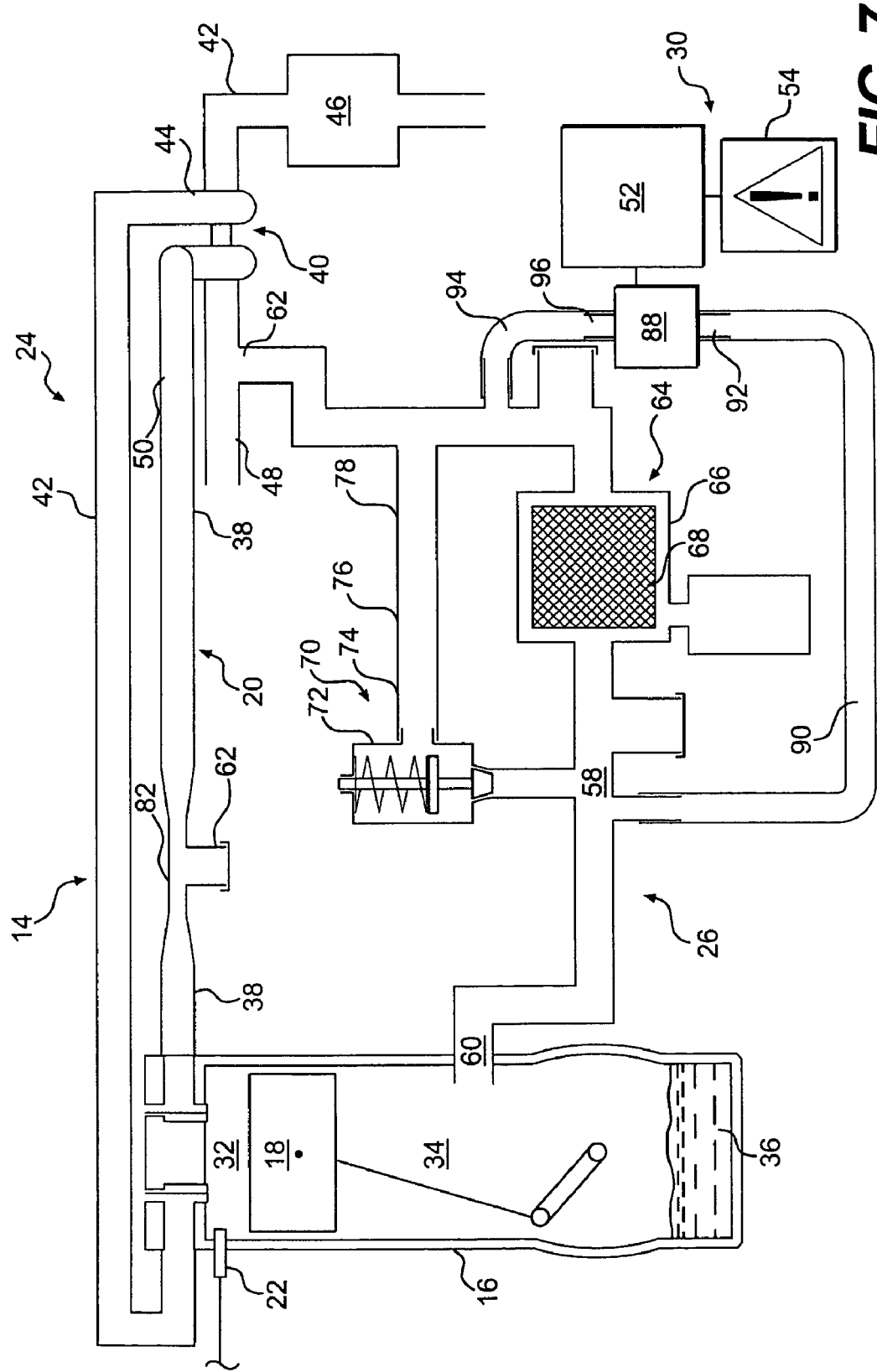
FIG. 7 is a schematic illustration of an engine consistent with yet another disclosed embodiment.

FIG. 7 shows engine 14 with a sensor 88 operable to sense a difference between a pressure of the gas upstream of filter system 64 and a pressure of the gas downstream of filter system 64. Sensor 88 may be a differential pressure sensor. A first tube 90 may connect a first port 92 of sensor 88 to a portion of passageway 58 between non-combustion chamber 34 and filter housing 66. Likewise, a second tube 94 may connect a second port 96 of sensor 88 to a portion of passageway 58 between filter housing 66 and second end 62 of passageway 58. Sensor 88 and its connection to the components of engine 14 are not limited to the configuration shown in FIG. 7. For example, one or both of first and second ports 92 and 96 of sensor 88 may connect directly to passageway 58. Additionally, first port 92 of sensor 88 may connect to non-combustion chamber 34 other than through passageway 58. Monitoring system 30 may be operatively connected to sensor 88.

Figure 8:
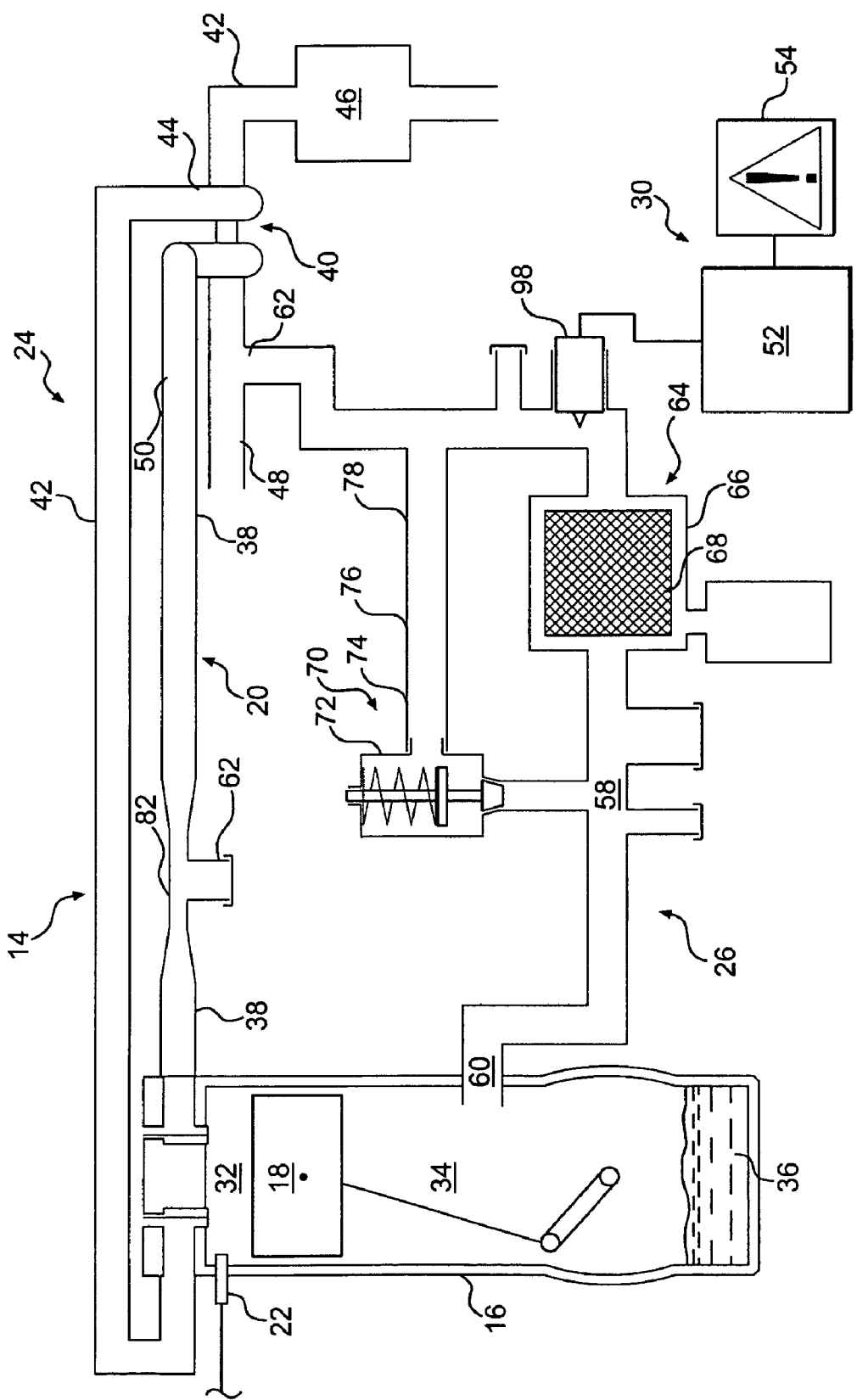
FIG. 8 is a schematic illustration of an engine consistent with yet another disclosed embodiment.

FIG. 8 shows engine 14 with a sensor 98 operable to sense a temperature of gas in chamber-ventilation system 26 and to produce a signal relating to the temperature of the gas in chamber-ventilation system 26. As is shown in FIG. 8, sensor 98 may be disposed within a portion of passageway 58 between filter housing 66 and second end 62 of passageway 58. Alternatively, sensor 98 may be mounted within any other portion of passageway 58. Monitoring system 30 may be operatively connected to sensor 98.

INDUSTRIAL APPLICABILITY

The disclosed embodiments of engine 14 have potential application in any type of work machine 10 requiring a source of power. Additionally, the disclosed embodiments of chamber-ventilation system 26 and sensors 28, 56, 80, 84, 86, 88, and 98 may have application with any internal combustion engine 14.

Various systems of work machine 10 may receive power from engine 14 and utilize that power to perform various tasks. Engine 14 generates power by combusting air supplied by air-intake system 20 and fuel supplied by fuel system 22 in combustion chamber 32. This creates high-pressure combustion gases in combustion chamber 32. The high-pressure combustion gases drive working member 18, which provides power for use by systems connected thereto. Some of the combustion gases in combustion chamber 32 may escape through spaces between housing 16 and working member 18 into non-combustion chamber 34.

During operation of certain configurations of engine 14 and chamber-ventilation system 26, gases may travel from non-combustion chamber 34, into first end 60 of passageway 58, through passageway 58, to second end 62 of passageway 58. During operation of engine 14, combustion gases escaping past working member 18 into non-combustion chamber 34 may elevate the pressure in non-combustion chamber 34 above atmospheric pressure. If the pressure in second end 62 of passageway 58 is lower than the pressure in non-combustion chamber 34, the pressure differential between non-combustion chamber 34 and second end 62 of passageway 58 drives gas out of non-combustion chamber 34 through passageway 58. In some embodiments, second end 62 of passageway 58 may be connected to a component wherein the pressure is generally lower than the pressure in non-combustion chamber 34 during operation of engine 14. For example, in the embodiments shown in FIGS. 2, 3, 5, 6, 7, and 8 the pressure in the portion of air-intake system 20 on the inlet side 48 of supercharger 40 and, thus, the pressure in second end 62 of passageway 58, will generally be near atmospheric pressure. As a result, during operation of these embodiments, the pressure in non-combustion chamber 34 will generally be higher than the pressure in second end 62 of passageway 58 and gas will travel out of non-combustion chamber 34 through chamber-ventilation system 26. In other embodiments, second end 62 of passageway 58 may be connected to a component at a point where a localized region of low pressure exists during operation of engine 14. For example, during operation of the embodiment shown in FIG. 4, the pressure within the portion of air-intake system 20 on the outlet side 50 of supercharger 40 is generally significantly higher than atmospheric pressure, but venturi 82 creates a localized region of low pressure adjacent second end 62 of passageway 58. Thus, the pressure in non-combustion chamber 34 may be higher than the pressure in second end 62 of passageway 58, even if the pressure in the portion of air-intake system 20 on the outlet side 50 of supercharger 40 is generally higher than the pressure in non-combustion chamber 34.

Configurations of chamber-ventilation system 26 other than those shown in FIGS. 3-8 may operate to ventilate gas out of non-combustion chamber 34, into first end 60 of passageway 58, through passageway 58, to second end 62 of passageway 58. Configurations other than those shown in FIGS. 3-8 may cause the pressure in non-combustion chamber 34 to be higher than the pressure in second end 62 of passageway 58 during operation of engine 14. Additionally, in certain embodiments, a pump in fluid communication with passageway 58 may force gas from non-combustion chamber 34 through passageway 58.

Filter system 64 may separate oil and/or debris from gas as it travels through passageway 58. Separating oil and/or debris from gas as it travels through passageway 58 may reduce fowling and wear of any systems to which chamber-ventilation system 26 routes gas. This may improve the performance and longevity of the systems to which chamber-ventilation system 26 routes gas. For example, in embodiments with chamber-ventilation system 26 connected to intake-air system 20 on an inlet side 48 of supercharger 40, filter system 64 may detain oil and/or debris that might otherwise fowl and/or wear supercharger 40 and engine 14.

Under certain circumstances, however, filter-bypass system 70 may allow gas ventilated from non-combustion chamber 34 to bypass filter system 64. For example, if filter 68 becomes clogged, gas within a portion of passageway 58 may reach a pressure high enough to open pressure-relief valve 72. This would allow gas to bypass filter system 64 through filter-bypass duct 76. Additionally, filter-bypass system 70 may operate in other manners. For example, in embodiments where filter-bypass system 70 includes controllable valves or shutters, controls of filter-bypass system 70 may open and close those valves or shutters to control whether gas upstream of filter system 64 is allowed to bypass filter system 64. In such embodiments, the controls of filter-bypass system 70 may open any controllable valves or shutters dependent upon the pressure of gas upstream of filter system 64 and/or other conditions of operation of engine 14.

Each sensor 28, 56, 80, 84, 86, 88, or 98 included in any particular embodiment may sense an operating condition of engine 14 and produce a signal relating to the operating condition sensed. For example, sensor 28 or sensor 56 may sense a condition of filter system 64 such as the presence or absence of filter 68 in chamber-ventilation system 26. Sensor 28 or sensor 56 may also produce a signal relating to the condition it senses. For example, in embodiments wherein sensor 56 is a switch operable to sense whether filter 68 is properly installed in chamber-ventilation system 26, sensor 56 may produce either an open-circuit signal or a closed-circuit signal depending upon whether filter 68 is properly installed in chamber-ventilation system 26. Additionally, sensor 28 or sensor 56 may sense other conditions of filter system 64, including, but not limited to, a position of one or more other components of filter system 64, a condition of the gas within filter system 64, a presence and/or quantity of filtered matter in filter system 64, and a quantity or condition of one or more treatment substances included with filter system 64.

Additionally, sensor 28 or sensor 80 may sense a condition of other components of chamber-ventilation system 26. For example, sensor 28 or 80 may sense whether pressure-relief valve 72 is open. Thus, sensor 28 or sensor 80 may also sense whether filter-bypass system 70 is allowing gas exiting non-combustion chamber 34 to bypass filter system 64. Sensor 28 or sensor 80 may also produce a signal relating to the condition it senses. For example, in embodiments wherein sensor 80 is a switch operable to sense whether pressure-relief valve 72 is open or closed, sensor 80 may produce either an open-circuit signal or a closed-circuit signal depending upon whether pressure-relief valve 72 is open or closed.

Operation of sensor 28 or sensor 80 is not limited to sensing whether pressure-relief valve 72 is open. Sensor 28 or sensor 80 may sense other conditions of one or more components of chamber-ventilation system 26. Additionally, sensor 28 or sensor 80 may sense other conditions that reveal whether filter-bypass system 70 is allowing gas to bypass filter system 64. For example, sensor 28 or 80 may sense whether gas is flowing in filter-bypass duct 76.

Furthermore, sensor 28, 84, 86, 88, or 98 may sense a condition of gas in chamber-ventilation system 26 or non-combustion chamber 34 and produce a signal relating to the condition of the gas. For example, sensor 28 or 84 may sense a pressure of gas upstream of filter system 64 and produce a signal relating to the pressure of the gas upstream of filter system 64. Additionally, sensor 28 or 86 may sense a pressure of gas downstream of filter system 64 and produce a signal relating to the pressure of the gas downstream of filter system 64. Furthermore, sensor 28 or 88 may sense a difference between a pressure of gas upstream of filter system 64 and a pressure of gas downstream of filter system 64 and produce a signal relating to the difference between the pressure of gas upstream of filter system 64 and the pressure of gas downstream of filter system 64. Moreover, sensor 28 or sensor 98 may sense a temperature of gas in chamber-ventilation system 26 and produce a signal relating to the temperature of the gas. Additionally, sensor 28, 84, or 86 may sense a velocity or a composition of gas within chamber-ventilation system 26.

Monitoring system 30 may receive signals produced by sensor 28, 56, 80, 84, 86, 88, and/or 98. Additionally, monitoring system 30 may selectively store a code and/or activate alarm 54 dependant upon signals received from sensor 28, 56, 80, 84, 86, 88, and/or 98 and, in certain embodiments, other conditions of operation of engine 14 and/or work machine 10. For example, monitoring system 30 may store a fault code in computer memory to allow a maintainer to detect potentially compromised operation of chamber-ventilation system 26. Additionally, monitoring system 30 may activate alarm 54 to alert an operator to potentially compromised operation of chamber-ventilation system 26.

Consistent with certain embodiments, monitoring system 30 may store a code and/or activate alarm 54 if sensor 28 or 56 produces a signal indicating potentially compromised operation of filter system 54. For example, if sensor 28 or sensor 56 produces a signal indicating that filter 68 is not properly installed in chamber-ventilation system 26, monitoring system 30 may store a code and/or activate alarm 54. Additionally, monitoring system 30 may store a code and/or activate alarm 54 if sensor 28 or 56 produces a signal indicating another condition of filter system 64 corresponding to potentially compromised operation. Other conditions of filter system 64 that may correspond to potentially compromised operation of filter system 64 may include an undesirable condition of some component of filter system 64 other than filter 68, an undesirable condition of the gas within filter housing 66, a large quantity of filtered matter in filter system 64, or depletion or degradation of a treatment substance. Additionally, whether monitoring system 30 stores a code and/or activates alarm 54 in response to a particular signal from sensor 28 or 56 may depend also upon conditions of operation of engine 14 and/or work machine 10 in addition to conditions sensed by sensor 28 or 56.

Additionally, monitoring system 30 may store a code and/or activate alarm 54 if sensor 28 or 80 produces a signal indicating a condition of one or more components of chamber-ventilation system 26 corresponding to potentially compromised operation of chamber-ventilation system 26. For example, if sensor 28 or 80 produces a signal indicating that pressure-relief valve 72 is open, this may indicate that filter system 64 is creating an undesirably high restriction in chamber-ventilation system 26. Accordingly, monitoring system 30 may store a code and/or activate alarm 54 when sensor 28 or 80 indicates that pressure-relief valve 72 is open. Additionally, monitoring system 30 may store a code and/or activate alarm 54 if sensor 28 or 80 produces a signal indicating another condition of one of the components of chamber-ventilation system 26 corresponding to potentially compromised operation. Moreover, whether monitoring system 30 stores a code and/or activates alarm 54 in response to a particular signal from sensor 28 or 80 may depend also upon conditions of operation of engine 14 and/or work machine 10 in addition to conditions sensed by sensor 28 or 80.

Furthermore, monitoring system 30 may store a code and/or activate alarm 54 if sensors 28, 84, 86, and/or 88 produce signals indicating a condition of the gas in chamber-ventilation system 26 corresponding to potentially compromised operation of chamber-ventilation system 26. For example, if sensor 28 or 84 produces a signal indicating that gas upstream of filter system 64 has a relatively high pressure, this may indicate that filter system 64 is creating an undesirably high restriction in chamber-ventilation system 26. Similarly, if sensors 84 and 86 produce signals indicating a relatively high difference between the pressure of the gas upstream of filter system 64 and the pressure of the gas downstream of filter system 64, this may indicate that filter system 64 is creating an undesirably high restriction in chamber-ventilation system 26. Likewise, if sensor 28 or 88 produces a signal indicating a relatively high difference in pressure between the gas upstream of filter system 64 and the gas downstream of filter system 64, this may indicate that filter system 64 is creating an undesirably high restriction in chamber-ventilation system 26. Accordingly, in response to receiving such signals from sensors 28, 84, 86, and/or 88, monitoring system 30 may store a code and/or activate alarm 54. Additionally, monitoring system 30 may store a code and/or activate alarm 54 if sensors 28, 84, 86, and/or 88 produce signals indicating another condition of the gas in chamber-ventilation system 26 corresponding to potentially compromised operation. Other conditions of the gas in chamber-ventilation system 26 that may correspond to chamber-ventilation system 26 having potentially compromised operation may include the gas having certain velocities or certain compositions. Moreover, whether monitoring system 30 stores a code and/or activates alarm 54 in response to particular signals from sensors 28, 84, 86, and/or 88 may depend also upon conditions of operation of engine 14 and/or work machine 10 in addition to conditions sensed by sensor 28, 84, 86, and/or 88.

Moreover, monitoring system 30 may store a code and/or activate alarm 54 if sensor 28 or 98 produces a signal indicating a temperature of the gas in chamber-ventilation system 26 that corresponds to potentially compromised operation of chamber-ventilation system 26. For example, if sensor 28 or 98 produces a signal indicating that the temperature of the gas in chamber-ventilation system 26 is lower than expected, it may indicate that some part of chamber-ventilation system 26 has been disconnected or removed, allowing cool air to enter chamber-ventilation system 26 from the atmosphere. Accordingly, if sensor 28 or 98 produces a signal indicating that the temperature of the gas in chamber-ventilation system 26 is significantly lower than expected, monitoring system 30 may store a code and/or activate alarm 54. Whether monitoring system 30 stores a code and/or activates alarm 54 in response to a particular signal from sensor 28 or 98 may depend also upon conditions of operation of engine 14 and/or work machine 10 in addition to conditions sensed by sensor 28 or 98. For example, the expected temperature of the gas in chamber-ventilation system 26 will depend on the conditions of operation of engine 14, such as how long engine 14 has been running, how much power engine 14 is producing, the temperature of coolant (not shown) or oil 36 in engine 14, and the ambient temperature. Accordingly, whether monitoring system 30 stores a code and/or activates alarm 54 in response to a signal from sensor 28 or 98 indicating a particular temperature of the gas in chamber-ventilation system 26 may depend upon such other conditions of operation of engine 14.

Additionally, monitoring system 30 may store a code and/or activate alarm 54 in response to receiving signals from sensor 98 indicating other temperatures of the gas corresponding to potentially compromised operation of chamber-ventilation system 26. For example, monitoring system 30 may store a code and/or activate alarm 54 in response to a signal from sensor 28 or 98 indicating that the temperature of the gas in chamber-ventilation system 26 is significantly lower than expected.

It will be apparent to those skilled in the art that various modifications and variations can be implemented with engine 14 without departing from the scope of the disclosure. Other embodiments will be apparent to those skilled in the art from consideration of the specification and practice of engine 14 disclosed herein. It is intended that the disclosure of these embodiments be considered as exemplary only, with a true scope of the disclosed embodiments being indicated by the following claims and their equivalents.

What is claimed is:

1. An engine, comprising:
   a housing;
   a working member movable within an interior of the housing and separating a combustion chamber from a non-combustion chamber;
   a chamber-ventilation system that includes a passageway with a first end of the passageway connected to the non-combustion chamber and a second end of the passageway located downstream of the first end of the passageway, wherein the chamber-ventilation system includes a filter system disposed within the passageway, the filter system including a filter housing and a filter disposed in the filter housing, and wherein the chamber-ventilation system is configured such that during operation of the engine gas travels from the non-combustion chamber, into the first end of the passageway, through the passageway, to the second end of the passageway; and
   a first sensor configured to sense a pressure of gas upstream of the filter system in the passageway and to produce a signal relating to the pressure of the gas upstream of the filter system.

2. The engine of claim 1, further including:
   a second sensor configured to sense a pressure of gas downstream of the filter system and to produce a signal relating to the pressure of the gas downstream of the filter system.

3. The engine of claim 1, wherein the first sensor is also configured to sense a pressure of gas downstream of the filter system and the sensor is configured to produce a signal relating to the difference between the pressure of the gas upstream of the filter system and the pressure of the gas downstream of the filter system.

4. The engine of claim 1, further including:
   a monitoring system operatively connected to the first sensor to receive the signal produced by the first sensor and configured to selectively do at least one of storing a code and activating an alarm dependant upon the signal received from the first sensor.

5. The engine of claim 1, wherein the first sensor is configured to sense a condition relating to a magnitude of restriction created in the chamber-ventilation system by the filter and to produce a signal relating to the sensed condition.

6. The engine of claim 1, further including:
   an air-intake system configured to supply air to the combustion chamber; and
   wherein the second end of the passageway is connected to the air-intake system.

7. The engine of claim 1, further including:
   an air-intake system, including a supercharger, configured to supply air to the combustion chamber; and
   wherein the second end of the passageway is connected to the air-intake system on an inlet side of the supercharger.

8. A method of operating an engine, which engine has a housing, a working member movable within an interior of the housing and separating a combustion chamber from a non-combustion chamber, an air-intake system configured to supply air to the combustion chamber, a chamber-ventilation system that includes a passageway with a first end of the passageway connected to the non-combustion chamber and a second end of the passageway located downstream of the first end of the passageway, and a filter system with a filter housing and a filter, the method comprising:
- directing gas out of the non-combustion chamber through the passageway;
- filtering the gas as it passes through the passageway;
- sensing one or more operating conditions upstream of the filter relating to a magnitude of restriction created in the chamber ventilation system by the filter; and
- producing one or more signals indicative of the magnitude of restriction created in the chamber ventilation system by the filter based at least in part on the one or more operating conditions sensed.

9. The method of claim 8, wherein sensing one or more operating conditions upstream of the filter includes sensing a pressure of gas upstream of the filter system, and wherein producing one or more signals indicative of the magnitude of restriction created in the chamber ventilation system by the filter based at least in part on the one or more operating conditions sensed includes producing a signal relating to the pressure of the gas upstream of the filter system.

10. The method of claim 9, including:
- sensing a pressure of gas downstream of the filter system; and
- wherein said producing one or more signals indicative of the magnitude of restriction created in the chamber ventilation system by the filter based at least in part on the one or more operating conditions sensed further includes producing a signal relating to the pressure of the gas downstream of the filter system.

11. The method of claim 8, wherein sensing one or more operating conditions includes sensing a difference between a pressure of gas upstream of the filter system and a pressure of gas downstream of the filter system, and wherein producing one or more signals indicative of the magnitude of restriction created in the chamber ventilation system by the filter includes producing a signal relating to the difference between the pressure of the gas upstream of the filter system and the pressure of the gas downstream of the filter system.

12. The method of claim 8, further comprising:
- selectively doing at least one of storing a code and activating an alarm dependent upon the one or more signals produced.

13. The method of claim 8, wherein directing gas out of the non-combustion chamber through the passageway includes directing the gas out of the non-combustion chamber, through the passageway, into the air-intake system.

14. The method of claim 8, wherein said producing one or more signals indicative of the magnitude of restriction created in the chamber ventilation system by the filter includes producing a plurality of signals that are collectively indicative of the magnitude of restriction created in the chamber ventilation system by the filter.

15. A machine, comprising:
- a chassis;
- an engine mounted to the chassis and comprising:
  - a housing;
  - a working member movable within an interior of the housing and separating a combustion chamber from a non-combustion chamber;
  - an air-intake system, including a supercharger, configured to supply air to the combustion chamber;
  - a chamber-ventilation system that includes a passageway with a first end of the passageway connected to the non-combustion chamber and a second end of the passageway connected to the air-intake system on an inlet side of the supercharger, wherein the chamber-ventilation system includes a filter system disposed within the passageway, the filter system including a filter housing and a filter disposed in the filter housing, and wherein the chamber-ventilation system is configured such that during operation of the engine gas travels from the non-combustion chamber, into the first end of the passageway, through the passageway, to the second end of the passageway;
  - a first sensor configured to sense a pressure of gas upstream of the filter and to produce a signal relating to the pressure of the gas; and
  - a monitoring system operatively connected to the first sensor to receive the signal produced by the first sensor and configured to provide an output based on the signal received from the first sensor.

16. The machine of claim 15, wherein the monitoring system is configured to do at least one of store a code and activate an alarm, dependant upon the signal received from the first sensor.

17. The machine of claim 16, further including:
- a second sensor configured to sense a pressure of gas downstream of the filter system and to produce a signal relating to the pressure of the gas downstream of the filter system.

18. The machine of claim 15, wherein the first sensor is configured to sense a difference between the pressure of the gas upstream of the filter and a pressure of gas downstream of the filter, and the first sensor is configured to produce the signal relating to the difference between the pressure of the gas upstream of the filter and the pressure of the gas downstream of the filter.

19. The machine of claim 15, wherein the first sensor is configured to produce a signal relating to a magnitude of restriction created in the chamber-ventilation system by the filter.

20. An engine, comprising:
- a housing;
- a working member movable within an interior of the housing and separating a combustion chamber from a non-combustion chamber;
- a chamber-ventilation system that includes a passageway with a first end of the passageway connected to the non-combustion chamber and a second end of the passageway located downstream of the first end of the passageway, wherein the chamber-ventilation system includes a filter system disposed within the passageway, the filter system including a filter housing and a filter disposed in the filter housing, and wherein the chamber-ventilation system is configured such that during operation of the engine gas travels from the non-combustion chamber, into the first end of the passageway, through the passageway, to the second end of the passageway; and
- a first sensor configured to sense a difference between a pressure of gas upstream of the filter system and a pressure of gas downstream of the filter system and to produce a signal relating to the difference between the pressure of the gas upstream of the filter system and the pressure of the gas downstream of the filter system.

* * * * *